W. H. TUCKER.
LIFTER FOR COOKING UTENSILS.
APPLICATION FILED JULY 9, 1917.
1,254,551.
Patented Jan. 22, 1918.
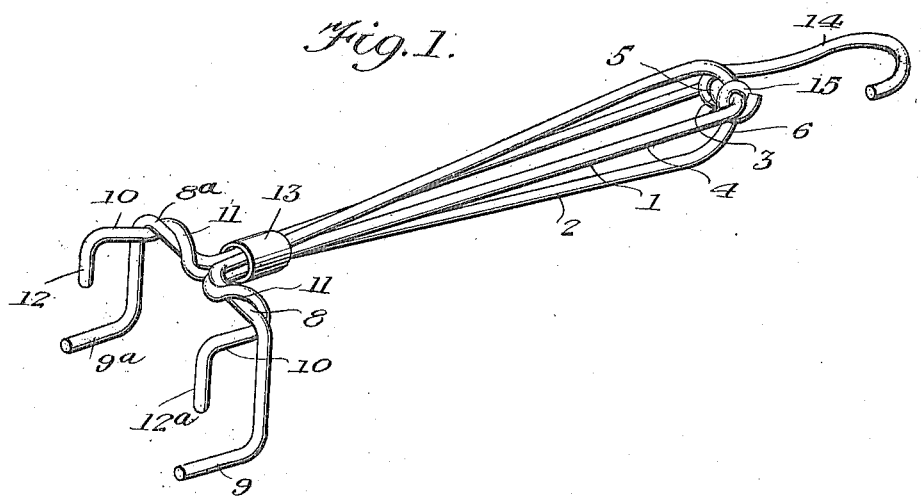
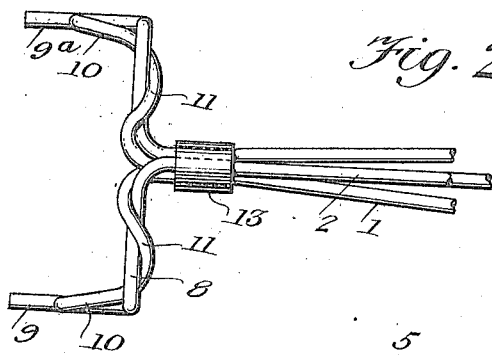
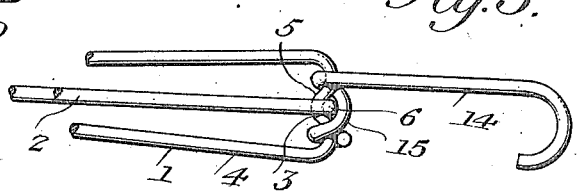
WITNESSES
R E Rousseau
J W Garner
INVENTOR
W. H. Tucker
BY Victor J. Evans
ATTORNEY

UNITED STATES PATENT OFFICE.

WALTER H. TUCKER, OF FLAGSTAFF, ARIZONA.

LIFTER FOR COOKING UTENSILS.

1,254,551.

Specification of Letters Patent. Patented Jan. 22, 1918.

Application filed July 9, 1917. Serial No. 179,452.

*To all whom it may concern:*

Be it known that I, WALTER H. TUCKER, a citizen of the United States, residing at Flagstaff, in the county of Coconino and State of Arizona, have invented new and useful Improvements in Lifters for Cooking Utensils, of which the following is a specification.

This invention is an improved lifter for cooking utensils, especially cooking utensils such as pans, pots or the like and which are highly heated, the object of the invention being to provide an improved implement of this kind which is extremely simple in construction, is strong and durable, which provides a handle which keeps cool so that the implement can be readily manipulated without danger of burning the hand and which also provides a hook for engaging the handles or bails of pots or the like and for use in lifting the same.

The invention consists in the construction, combination and arrangement of devices hereinafter described and claimed.

In the accompanying drawings:—

Figure 1 is a perspective view of a lifter constructed and arranged in accordance with my invention.

Figs. 2 and 3 are detailed views of the same.

My improved lifter comprises a pair of members 1, 2 each of which is formed from a piece of wire of suitable length and gage, each of the said members being bent and doubled to provide a handle portion at one end. The bight 3 of the handle portion 4 of the member 1 is bent to form a substantially V-shaped portion 5. The bight 6 of the handle portion 7 of the member 2 is at right-angles to the bight 3 and engages in said V-shaped portion 5 as shown so that the bights which constitute the outer ends of the handle portions of the members are securely fastened together.

The ends of the member 1 are turned outwardly and one of said ends is bent downwardly as at 8ª and also bent to form an outwardly directed lower hook 9ª. The other end of the member 1 is bent to form a downwardly directed upper hook 12ª. The ends of the member 2 are also bent outwardly and one of said ends is bent at 10 to form a downwardly directed upper hook 12, the opposite end of said member 2 being bent at 8 and also bent to form an outwardly directed lower hook 9. The outwardly turned ends of the member 1 are arranged in coils 11 around the outwardly turned ends of the member 2 as shown. The upper hooks 12, 12ª are adapted to engage over the upper edge and on the inner side of a pan or the like the lower hooks being adapted to engage on the outer side thereof, as will be understood. The handle portions of the members 1, 2 are arranged in contact at the inner end of the handle and are secured and held by a ferrule or ring 13. The doubled handle portions of the members 1, 2 provide the lifter with a handle of open construction which is kept cool by the atmosphere so that the lifter may be used without the aid of a cloth and without danger of burning the hand.

I also provide a pot lifting hook 14 at the outer end of the handle of the lifter and which is made of a piece of wire of suitable length and gage and the inner end of which is formed with coils 15 which extend around the bight of the handle portion of the member 1 and the opposite sides of the bight of the handle portion of the member 2, so that the connection between the bights of the handle portions is strengthened by the coils.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. A lifter of the class described, comprising a pair of members each having a doubled handle portion, the bight of one of which is at right-angles to that of the other and engaged therewith, the said members being in contact at the inner end of the handle, one of said members having outwardly turned ends terminating respectively in lower and upper hooks, the other member having outwardly turned ends arranged in coils around the outwardly turned ends of the first-named member and terminating respectively in upper and lower hooks.

2. A lifter of the class described, comprising a pair of members each having a doubled handle portion, the bight of one of which is at right-angles to that of the other and engaged therewith, the said members being in contact at the inner end of the handle, one of said members having outwardly turned ends terminating respectively in lower and upper hooks, the other member having outwardly turned ends arranged in coils around the outwardly turned ends of the first-named member and terminating respectively in upper and lower hooks, a ferrule passing around and securing the inner ends of the handle portions of said members together, and a hook at the outer end of the handle portion of the lifter and having coils engaging the bight of the handle portion of one of the members and the opposite sides of the bight of the handle portion of the other member.

In testimony whereof I affix my signature.

WALTER H. TUCKER.

Copies of this patent may be obtained for five cents each, by addressing the "Commissioner of Patents, Washington, D. C."